United States Patent [19]

Hertel et al.

[11] 4,195,973
[45] Apr. 1, 1980

[54] PROCESS FOR PRINTING WITH DEVELOPING DYES WHICH EMPLOYS HAVING ETHER SUBSTITUENTS DERIVED FROM GLYCOLS, POLYGLYCOLS, OR ALKOXY DERIVATIVES THEREOF

[75] Inventors: Hasso Hertel, Muhlheim; Horst Curtius, Kelkheim; Erich Feess, Hofheim am Taunus; Paul Karacsonyi, Kronberg, all of Fed. Rep. of Germany

[73] Assignee: Hoechst Aktiengesellschaft, Frankfurt am Main, Fed. Rep. of Germany

[21] Appl. No.: 958,134

[22] Filed: Nov. 6, 1978

[30] Foreign Application Priority Data

Nov. 2, 1977 [DE] Fed. Rep. of Germany ....... 2748931

[51] Int. Cl.$^2$ ......................... C09B 27/00; D06P 1/12
[52] U.S. Cl. ................................................ 8/46; 8/71
[58] Field of Search ........................................ 8/46, 71

[56] References Cited

U.S. PATENT DOCUMENTS

| | | | |
|---|---|---|---|
| 2,845,326 | 7/1958 | Streck | 8/46 |
| 3,000,298 | 9/1961 | Bryant | 8/46 X |
| 3,920,386 | 11/1975 | Beyer et al. | 8/46 X |
| 4,094,637 | 6/1978 | Feess et al. | 8/46 X |

*Primary Examiner*—Sandra M. Person
*Attorney, Agent, or Firm*—Connolly and Hutz

[57] ABSTRACT o-Aminophenol ethers deriving from lower alkylene glycols, lower alkylene polyglycols and the corresponding mono-lower alkyl ethers which may be substituted in the phenyl nucleus by halogen or nitro, are useful as diazo components in the "all-in" printing process for preparing developing dyes on cellulose. In this process the printing paste contains the alkaline solution of the coupling component, a dispersion of the amine, sodium nitrite and a thickening composition and developing of the dye is brought about with acidic means, followed by or combined with a heat treatment.

5 Claims, No Drawings

PROCESS FOR PRINTING WITH DEVELOPING DYES WHICH EMPLOYS HAVING ETHER SUBSTITUENTS DERIVED FROM GLYCOLS, POLYGLYCOLS, OR ALKOXY DERIVATIVES THEREOF

U.S. Pat. No. 4,094,637 relates to a process for producing prints with developing dyes on textile material containing or consisting of cellulose by printing the fabric with a printing paste containing
(a) an alkaline solution of a coupling component suitable for the printing with developing dyes,
(b) a dispersion of an amine suitable for the preparation of developing dyes,
(c) sodium nitrite, and
(d) a printing thickener, and developing the print with acidic means, wherein the dyestuff formation is brought about by acidic steaming, preferably with superheated steam having a temperature of from 130° to 150° C. and containing formic acid or a mixture of formic acid and acetic acid as acidic agent. The dyestuff can also be developed on the fiber by applying dilute aqueous solutions of organic acids having a minimum solubility in water of 30 g per 100 g of water, a pK value of from 4.0 to 2.5 at 20° C., and a boiling point, at normal pressure, which exceeds 175° C., and finally steaming the material with neutral steam or drying it rapidly. The fabric is preferably printed with printing pastes which contain, in addition to the components for the developing dyes, soluble leuco sulfuric acid ester vat dyes.

Preferred amines to be used in this process are those which are not only scarcely volatile with steam. This ensures not only a good reproducibility of the prints but also a number of further advantages: There is no need for devices that prevent amine vapor from escaping into the atmosphere during the printing, steaming and drying operations; operations of machinery need not be interrupted to remove condensed amines, and dyestuff classes which are fixed by steaming can be used together with the developing dyes. Analogous difficulties may occur with the use of amines that tend to sublimation under the process conditions or in the drying process. When amines of this type are used sublimation onto the whites and on areas printed with other amines may occur during storage of the dried prints prior to the developing of the dye. This may reduce the depth of color and alter the color shades.

It has now been found that the aforesaid disadvantages can be avoided by using in this process as amine a compound of the formula

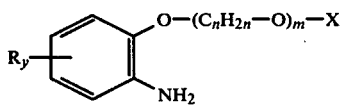

in which X is hydrogen or alkyl of 1 to 4 carbon atoms, n is 2 to 6 and m stands for 1 to 4, R is hydrogen, halogen, preferably chlorine, or nitro, y is 1 or 2 and the alkylene radical of the formula $C_nH_{2n}$ may have a straight or branched chain.

Suitable amines are, for example, O-methyl-O'-(4-nitro-2-amino-phenyl)-ethylene glycol, O-methyl-O'-(5-nitro-2-amino-phenyl)-ethylene glycol, O-methyl-O'-(6-nitro-2-amino-phenyl)-ethylene glycol, O-ethyl-O'-(4-nitro-2-amino-phenyl)-ethylene glycol, O-ethyl-O'-(5-nitro-2-amino-phenyl)-ethylene glycol, O-isopropyl-O'-(4-nitro-2-amino-phenyl)-ethylene glycol, O-n-butyl-O'-(4-nitro-2-amino-phenyl)-ethylene glycol, O-n-butyl-O'-(5-nitro-2-amino-phenyl)-ethylene glycol, O-n-butyl-O'-(5-nitro-2-amino-phenyl)-ethylene glycol, O-methyl-O'-(4-nitro-amino-phenyl)-diethylene glycol, O-methyl-O'-(5-nitro-2-amino-phenyl)-diethylene glycol, O-ethyl-O'-(4-nitro-2-amino-phenyl)-diethylene glycol, O-ethyl-O'-(5-nitro-2-amino-phenyl)-diethylene glycol, O-butyl-O'-(4-nitro-2-amino-phenyl)-diethylene glycol, O-butyl-O'-(5-nitro-2-amino-phenyl)-diethylene glycol, O-methyl-O'-(4-nitro-2-amino-phenyl)-triethylene glycol, O-methyl-O'-(5-nitro-2-amino-phenyl)-triethylene glycol, O-methyl-O'-(4-nitro-2-amino-phenyl)-propylene glycol, O-methyl-O'-(5-nitro-2-amino-phenyl)-propylene glycol, O-ethyl-O'-(4-nitro-2-amino-phenyl)-propylene glycol, O-butyl-O'-(5-nitro-2-amino-phenyl)-propylene glycol, O-methyl-O'-(4-nitro-2-amino-phenyl)-butylene glycol, O-(4-nitro-2-amino-phenyl)-ethylene glycol and O-(5-nitro-2-amino-phenyl)-ethylene glycol.

The amines to be used according to the invention are partially known and can be obtained, for example, by condensation of the corresponding o-halo-nitrobenzenes with the corresponding glycols or glycol ethers in the presence of bases, for example alkali metal hydroxides, with subsequent reduction of the nitro group to the amino group. The amines obtained in this manner can then be nitrated. The condensation of o-halo-nitrobenzenes with glycols is described, for example, in German Pat. No. 379,881. The nitro group is reduced according to known methods, for example catalytically or with iron.

The dispersions of the amines required in the process of the invention can be prepared in various ways that are known per se.

For example, adequate dispersions may be obtained by grinding an amine in an aqueous suspension, advantageously in the presence of a dispersing agent, to avoid formation of agglomerates; the grinding operation may be run in a roller or vibratory mill filled with balls; especially useful are ball mills provided with stirrers and filled with glass beads or natural sand. Fine division using a so-called dissolver often also leads to useful results.

It is also possible to mix with water a solid composition that has been prepared by spray-drying a base dispersion containing a solid dispersing agent or by grinding a mixture of a solid dispersing agent and the amine, for example in a pin mill. Suitable dispersions may also be obtained by blending a solution of an amine and a suitable dispersing agent in a water-soluble solvent with water or the printing paste. If the dispersing agent is liquid and has a sufficiently high dissolving power for the amine, an additional solvent need not be used.

The dispersing agents used may be of anionic or nonionic nature and belong, for example, to the following classes of substances:

Alkyl sulfonates, alkylaryl sulfonates, aryl sulfonates, lignin sulfonates, sulfonated cresol-formaldehyde resins, condensation products of formaldehyde and naphthalene sulfonic acids, alkanoyl amino-sulfonic acids, alkyl polyglycol ethers, alkylaryl polyglycol ethers, aryl polyglycol ethers or acyl polyglycol esters.

The dispersions consist of from about 25 to 60% by weight of base and from about 4 to 15% by weight of the dispersing agent. In addition, they may contain an agent, such as glycol or glycerol, to prevent freezing or drying, or a fungicide, such a pentachlorophenol, to suppress possible formation of mould during a prolonged period of storage.

As printing thickeners, any thickener which is resistant to alkali and of low solid content may be used, for example locust bean flour ether thickeners or thickeners on the basis of carboxymethyl cellulose.

The printing pastes may also contain conventional printing aids, such as glycerol, diglycol or dihydroxy-diethyl sulfide.

Besides the components for the developing dyes the printing pastes may contain soluble leuco sulfuric acid ester vat dyes and reactive dyes that are sufficiently resistant at room temperature to dilute alkali and other substances contained in the printing pastes, whereby the coloring possibilities are increased.

As coupling components to be used in the process of the invention, preferably low-substantivity or medium-substantivity aryl amides, especially phenyl amides or biphenyl diamides which may be substituted of acetoacetic acid, of 2-hydroxy naphthalene-3- carboxylic acid or of heterocyclic o-hydroxy-carboxylic acid may be mentioned, for example 5-chloro-2-acetoacetylamino-1,4-diethoxy benzene, 4,4'-bis-(acetoacetylamino)-3,3'-dimethyl diphenyl and 2-acetoacetyl-amino-6-ethoxy-benzthiazole, as well as 2-hydroxy-naphthalene-3-carboxylic acid phenylamide and its derivatives which carry lower alkyl or lower alkoxy groups (of 1 to 4 carbon atoms) or chlorine atoms in the phenyl radical, such as 2-hydroxy-naphthalene-3-carboxylic acid-(2'-methyl-phenyl-1')-amide, 2-hydroxy-naphthalene-3-carboxylic acid (2'-methoxy-phenyl-1')-amide, 2-hydroxy-naphthalene-3-carboxylic acid-(3'-chloro-6'-methoxy-phenyl-1')-amide, and 2-hydroxy-carbazole-3-carboxylic acid-(4'-chloro-phenyl-1')-amide.

In the following preferred embodiments of the process of the invention are described in detail.

After drying in a drying chamber or box, the prints are developed in a steamer, preferably by means of steam containing formic acid or a mixture of formic acid and acetic acid. It is preferred to use superheated steam having a temperature of from about 130° to 150° C., the passage times for the development of the dyes being in the range of from 5 to 20 seconds.

Alternatively the dried prints can be developed by applying a dilute aqueous solution of the high boiling organic acids defined above and then rapidly drying or steaming with neutral steam.

Suitable high boiling acids for the dyestuff development on the fiber are low-molecular organic monohydroxy-monocarboxylic acids, dihydroxy-dicarboxylic acids, monohydroxy-tricarboxylic acids or halocarboxylic acids such as lactic acid, glycolic acid, tartaric acid, citric acid, or monochloroacetic acid.

These acids are transferred onto the printed and dried textile material in an amount of from 50 g/l to 300 g/l of water, preferably 100 g to 200 g/l of water, by padding, slop-padding, spraying or cross-printing with the help of an entirely engraved stipping roller or a full-printing screen.

Diazotization and coupling which yield the final dyestuff set in spontaneously and almost at the same time, so that—in the simplest case—a continuous air passage of from 40 to 90 seconds is sufficient to complete the development of the dye. The development of the dyestuff can be substantially accelerated by using heat, for example by treating the print with hot air at 130°-160° C. during 20 to 60 seconds in a heating chamber, or by neutral steaming with saturated or superheated steam during 10 to 20 seconds at 100°-150° C.

The following Examples illustrate the invention, the parts and percentages are by weight unless stated otherwise.

The amine dispersions had an average particle size of 0.002 mm or less (cf. U.S. Pat. Nos. 4,057,389 and 4,094,637).

EXAMPLE 1

17 Parts of 2-hydroxynaphthalene-2-carboxylic acid (2'-methylphenyl-1')-amide (C.I. No. 37520) are dissolved in a mixture of 5 parts of monoethylene glycol, 6.5 parts of diethylene glycol, 1.6 parts of water and 8 parts of 33% sodium hydroxide solution. Then, 50 parts of a 28.5% aqueous dispersion of O-methyl-O'-(5-nitro-2-aminophenyl)-ethylene glycol containing as dispersing agent 20% of a lignin sulfonate are prepared.

First, the naphtholate solution, then the amine dispersion and finally a solution of 20 parts of sodium nitrite in 40 parts of water are stirred into 400 parts of a 5% aqueous thickener of locust bean flour ether diluted with 250 parts of water which contain 13.5 parts of 33% sodium hydroxide solution and the whole is made up to 1,000 parts with water.

On a roller printing machine bleached and mercerized cotton fabric is printed with this printing paste. After drying in a drying chamber, the fabric is passed through a steamer where it is exposed for 20 seconds to superheated steam of 130° C. containing formic acid and acetic acid. It is then rinsed in usual manner with cold and hot water, washed in hot water and rinsed again in hot and cold water. A bordeaux print having good fastness properties is obtained.

EXAMPLE 2

When in Example 1 the 17 parts of 2-hydroxynaphthalene-3-carboxylic acid-(2'-methylphenyl)-1')-amide are replaced by 16 parts of 2-hydroxy-naphthalene-3-carboxylic acid phenyl amide (C.I. 37505), a bluish red print is obtained having good fastness properties.

EXAMPLE 3

12 Parts of 4,4'-bis-acetoacetylamino-3,3'-dimethyl-diphenyl (C.I. 37610) are dissolved in a mixture of 12 parts of monoethylene glycol, 12 parts of diethylene glycol, 9.4 parts of 33% sodium hydroxide solution and 5.6 parts of water of 30° C. Then, 50 parts of a 28.5% aqueous dispersion of O-methyl-O'-(5-nitro-2-aminophenyl)-ethylene glycol, containing 20% of a sulfo group-containing cresolformaldehyde resin as dispersing agent, are diluted with 50 parts of water.

First 7.5 parts of 33% sodium hydroxide solution, then the solution of the coupling component, the dilute amine dispersion and finally a solution of 20 parts of sodium nitrite in 40 parts of water are stirred into 400 parts of a 5% aqueous thickener of a locust bean flour ether diluted with 250 parts of water and the whole is made up to 1,000 parts.

On a roller printing machine bleached and mercerized cotton fabric is printed with the printing paste so obtained and dried. Directly prior to steaming the fabric is impregnated, on a two-roller padding machine, with a cold aqueous, 10% solution of monochloroacetic acid at a liquor pick-up of 75% and then treated for 2 minutes in a steamer with neutral saturated steam of 102° C.

The fabric is then rinsed as usual with cold and hot water, washed with hot water, rinsed again with hot and cold water and dried. A print of full golden yellow shade having good fastness properties is obtained.

EXAMPLE 4

When a print is produced as described in Example 3 with the exception that, instead of O-methyl-O'-(5-nitro-2-aminophenyl)-ethylene glycol, a dispersion of the 4-nitroisomer is used, a print of full yellow shade having good fastness properties is obtained.

EXAMPLE 5

20 Parts of 2-hydroxynaphthalene-3-carboxylic acid-(2'-ethoxyphenyl-1')-amide (C.I. No. 37558) are dissolved in a mixture of 16 parts of ethanol, 30 parts of β,β'-dihydroxy-diethyl sulfide, 16 parts of 33% sodium hydroxide solution and 40 parts of water of 40° C. and the solution is diluted with 200 parts of water.

First, the naphtholate solution so obtained, then 55 parts of a 30.5% dispersion, diluted with water in a ratio of 1:5, of O-ethyl-O'-(4-nitro-2-aminophenyl)-propylene glycol, containing 15% of a sulfonated cresol-formaldehyde resin as dispersing agent, and finally a solution of 20 parts of sodium nitrite in 40 parts of water are added to 400 parts of a 8% thickener of a nonionic locust bean flour ether.

The print is produced and the dyestuff developed as described in Example 1. A scarlet pattern is obtained having good fastness properties.

EXAMPLE 6

When working under the conditions of Example 5 with the exception that, instead of the dispersion defined in this example, a dispersion of O-methyl-O'-(5-nitro-2-aminophenyl)-propylene glycol with otherwise the same composition is used, a red printed pattern having good fastness properties is obtained.

EXAMPLE 7

15 Parts of 2-hydroxynaphthalene-3-carboxylic acid-(5'-chloro-2',4'-dimethoxyphenyl-1')-amide (C.I. No. 37550) are stirred together with a mixture of 40 parts of ethanol, 30 parts of β,β'-dihydroxy-diethyl sulfide and 13 parts of 33% sodium hydroxide solution and dissolved by adding 50 parts of water of 70° C. Then, 27 parts of a 40% aqueous dispersion of O-ethyl-O'-(4-nitro-2-aminophenyl)-ethylene glycol, containing 12.5% of glycol and 20% of lignin sulfonate as dispersing agent are diluted with 80 parts of water.

First, the naphtholate solution, then the diluted amine dispersion and finally a solution of 20 parts of sodium nitrite in 40 parts of water are stirred into 400 parts of a 60% aqueous thickener of a locust bean flour ether diluted with 300 parts of water.

The fabric is printed and the dyestuff developed under the conditions of Example 1. A red printed pattern is obtained having good fastness properties.

EXAMPLE 8

When working under the conditions of Example 7 with the exception that, instead of the dispersion defined in this example, a dispersion of O-ethyl-O'-(5-nitro-2-aminophenyl)-diethylene glycol with otherwise the same composition is used, a bordeaux printed pattern having good fastness properties is obtained.

EXAMPLE 9

A solution of 20 parts of 5-chloro-2-acetoacetylamino-1,4-dimethoxybenzene (C.I. N. 37613) in 32 parts of ethanol, 40 parts of water and 20 parts of 33% sodium hydroxide solution is stirred into 400 parts of a 5% aqueous thickener of a locust bean flour ether and 300 parts of water. Then, 53 parts of a 40% dispersion of O-butyl-O'-(4-nitro-2-amino-phenyl)-ethylene glycol in water/ethylene glycol containing 10% of the following polyglycol ether

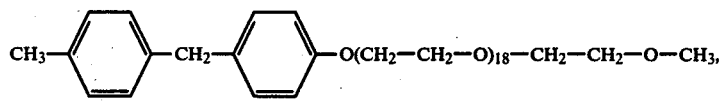

as dispersing agent diluted with 100 parts of water and 20 parts of sodium nitrite dissolved in 30 parts of water are successively added.

Bleached and mercerized cotton fabric is printed on a screen printing machine with the printing paste so obtained. After drying in the drying box following the printing machine, the fabric is sprayed with a cold, aqueous 30% solution of monochloroacetic acid in an electrostatic spraying device preceding the steamer, up to a liquor pick-up of 20% and immediately treated in the steamer for 20 seconds with superheated steam of 150° C. After the usual rinsing and soaping, a yellow printed pattern is obtained having good fastness properties.

EXAMPLE 10

10 Parts of 2-hydroxynaphthalene-3-carboxylic acid-(2'-ethoxyphenyl-1')-amide (C.I. No. 37558) and 10 parts of 4,4'-bisacetoacetylamino)-3,3'-dimethyldiphenyl (C.I. No. 37610) are stirred together with 25 parts of ethanol, 30 parts of butyl diglycol and 23 parts of 33% sodium hydroxide solution and dissolved by adding 100 parts of water of 60° C. The solution so obtained is stirred into 400 parts of a 5% aqueous thickener of a locust bean flour ether, next 30 parts of the amine dispersion as used in Example 4, diluted with 70 parts of water, and 20 parts of sodium nitrite dissolved in 40 parts of water are added. The required viscosity is adjusted by adding 250 parts of water.

The fabric is printed and the dyestuff developed under the conditions of Example 1. An orange printed pattern is obtained having good fastness properties.

EXAMPLE 11

20 Parts of nickel phthalocyanine-tetra [sulfonic acid (3'-<3"-methylpyrazolonyl-1">-phenyl-1')-amide] are stirred with 25 parts of ethanol, 30 parts of β,β'-dihydroxyethyl sulfide and 20 parts of 33% sodium hydroxide solution and dissolved by adding 100 parts of water of 40° C. Then 30 parts of a 42% dispersion of O-methyl-O'-(4-nitro-2-aminophenyl)-ethylene glycol in water/ethylene glycol (containing 17% of lignin sulfonate as dispersing agent) are diluted with 100 parts of water.

First, the solution of the coupling component, then the diluted amine dispersion and finally a solution of 20 parts of sodium nitrite in 40 parts of water are added to 400 parts of a 5% thickener of a locust bean flour ether and the whole is made up to 1,000 parts with water.

On a printing machine as used in pratice a pattern is printed with the printing paste so obtained on bleached and mercerized cotton twill and the fabric is dried. After spraying the fabric in an electrostatic spraying device preceding the steamer with a cold, aqueous solution of 300 g/l of monochloroacetic acid to a liquor pick-up of 20%, the fabric is immediately steamed in a steamer for 20 seconds with superheated steam of 150° C.

After the usual rinsing and soaping, a green printed pattern is obtained having good fastness properties.

What is claimed is:

1. In a process for producing prints with developing dyes on cellulose-containing or fully cellulosic textile materials by printing the fabric with a printing paste containing
   (a) an alkaline solution of a coupling component suitable for the printing with developing dyes,
   (b) a dispersion of an amine suitable for the preparation of developing dyes,
   (c) sodium nitrite, and
   (d) a printing thickener, and developing the print with acidic agents, wherein the dyestuff formation is brought about by acidic steaming, or by applying a dilute aqueous solution of an organic acid having a minimum solubility in water of 30 g/100 g of water, a pK value of 4.0 to 2.5 at 20° C. and a boiling point above 175° C. at normal pressure, with subsequent steaming with neutral steam or rapid drying, the improvement which comprises using as amine a compound of the formula

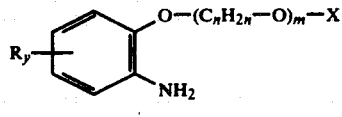

in which X is hyrogen or alkyl of 1 to 4 carbon atoms, n is 2 to 6 and m stands for 1 to 4, R being hydrogen, halogen or nitro, y is 1 or 2 and the alkylene radical of the formula $C_nH_{2n}$ being a straight or branched chain.

2. A process as claimed in claim 1, wherein R is hydrogen, chlorine or nitro.

3. A process as claimed in claim 1, wherein n is 2, m is 1 or 2, X is hydrogen, methyl or ethyl, R is hydrogen or nitro and y is 1.

4. A process as claimed in claim 1, wherein the amine is 2-(2'-methoxy-ethoxy)-4-nitro-aniline.

5. A process as claimed in claim 1, wherein the amine is 2-(2'-methoxy-ethoxy)-5-nitro-aniline.

* * * * *